United States Patent [19]
Gilmore

[11] 3,935,788
[45] Feb. 3, 1976

[54] PORTABLE MILLING TOOL

[75] Inventor: Guy T. Gilmore, Houston, Tex.

[73] Assignee: Multi Fab. Inc., Houston, Tex.

[22] Filed: Sept. 23, 1974

[21] Appl. No.: 508,693

[52] U.S. Cl. .................. 90/12 R; 90/15 R; 90/16; 144/114 R; 144/134 R; 144/134 D; 144/136 R; 144/136 C; 408/137
[51] Int. Cl.² .................................. B23C 1/20
[58] Field of Search....... 90/12 R, 15 R, 16; 408/88, 408/137, 234; 51/180; 144/134 R, 136 R, 114 R, 118, 119 R, 134 D, 136 C

[56] References Cited
UNITED STATES PATENTS

| 480,040 | 8/1892 | Saylor | 408/137 |
|---|---|---|---|
| 2,827,836 | 3/1958 | Horth et al. | 90/15 X |
| 3,382,768 | 5/1968 | Mount | 90/12 R |
| 3,489,191 | 1/1970 | Blevins | 144/134 D |

Primary Examiner—J. M. Meister
Assistant Examiner—Fred A. Silverberg

[57] ABSTRACT

A unit for milling rectangular work members, where a machined fit is required, such as the door facings of a filter unit having a series of doors into an exchange unit, or equipment bases where a pump or turbine is being installed which requires a machined surface and it is necessary to accomplish the cut in place.

2 Claims, 5 Drawing Figures

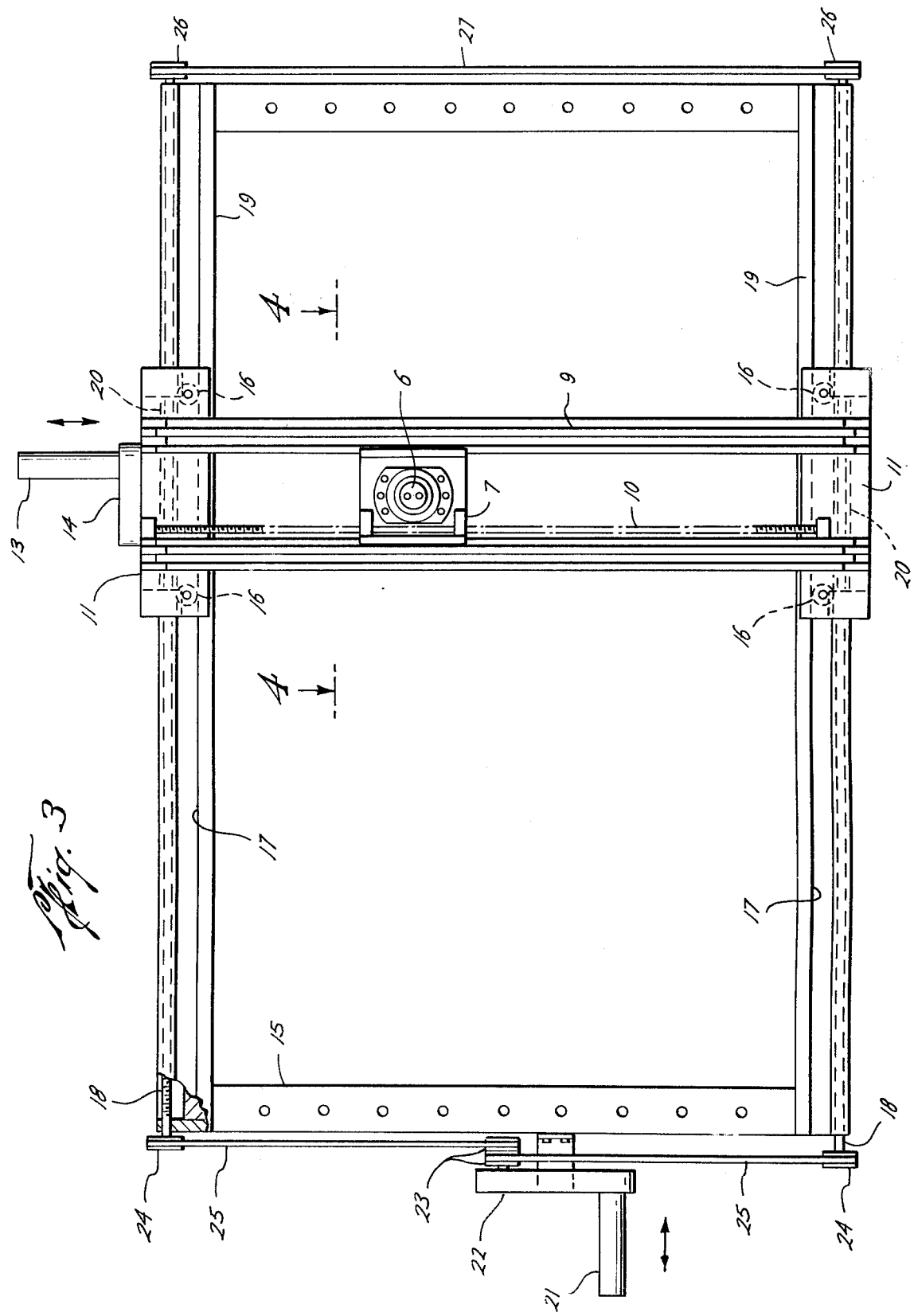

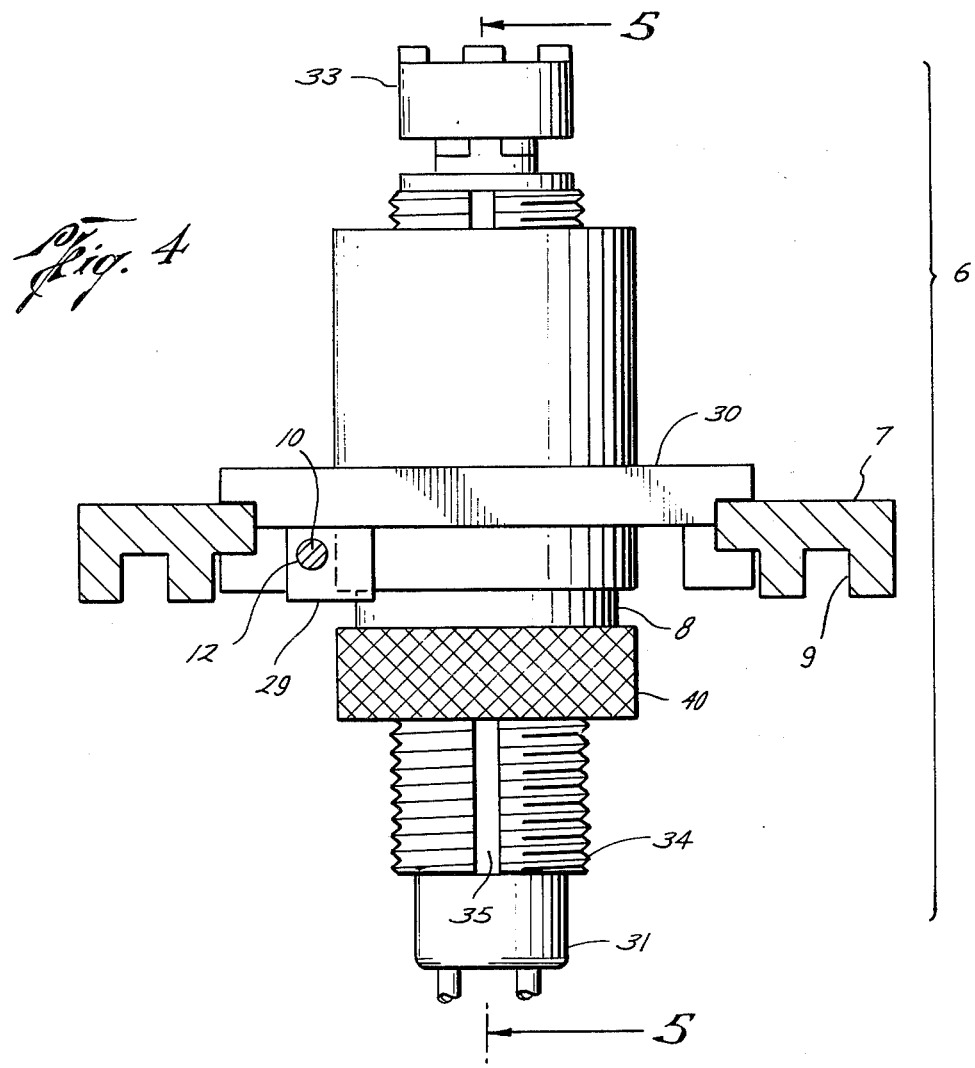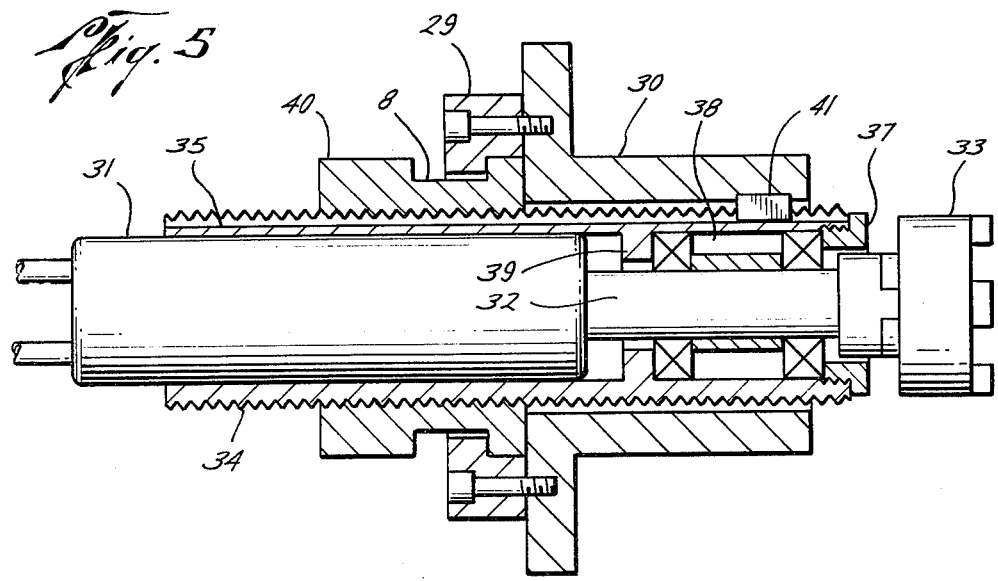

PORTABLE MILLING TOOL

SUMMARY OF THE INVENTION

A portable milling unit having self contained means for actuating a cutter head, and simultaneously moving the head on a rectangular frame to machine the surface of the work, the cutterhead moving horizontally and vertically, selectively, to accomplish the cut.

BRIEF DESCRIPTION OF THE DRAWINGS

FIG. 3 is a front elevational view taken on the line 3—3 of FIG. 1.

FIG. 4 is an enlarged side elevational view of the cutter head assembly, taken on the line 4—4 of FIG. 3, and FIG. 5 is a cross sectional view taken on the line 5—5 of FIG. 4.

DESCRIPTION OF THE PREFERRED EMBODIMENT

Figure 1:
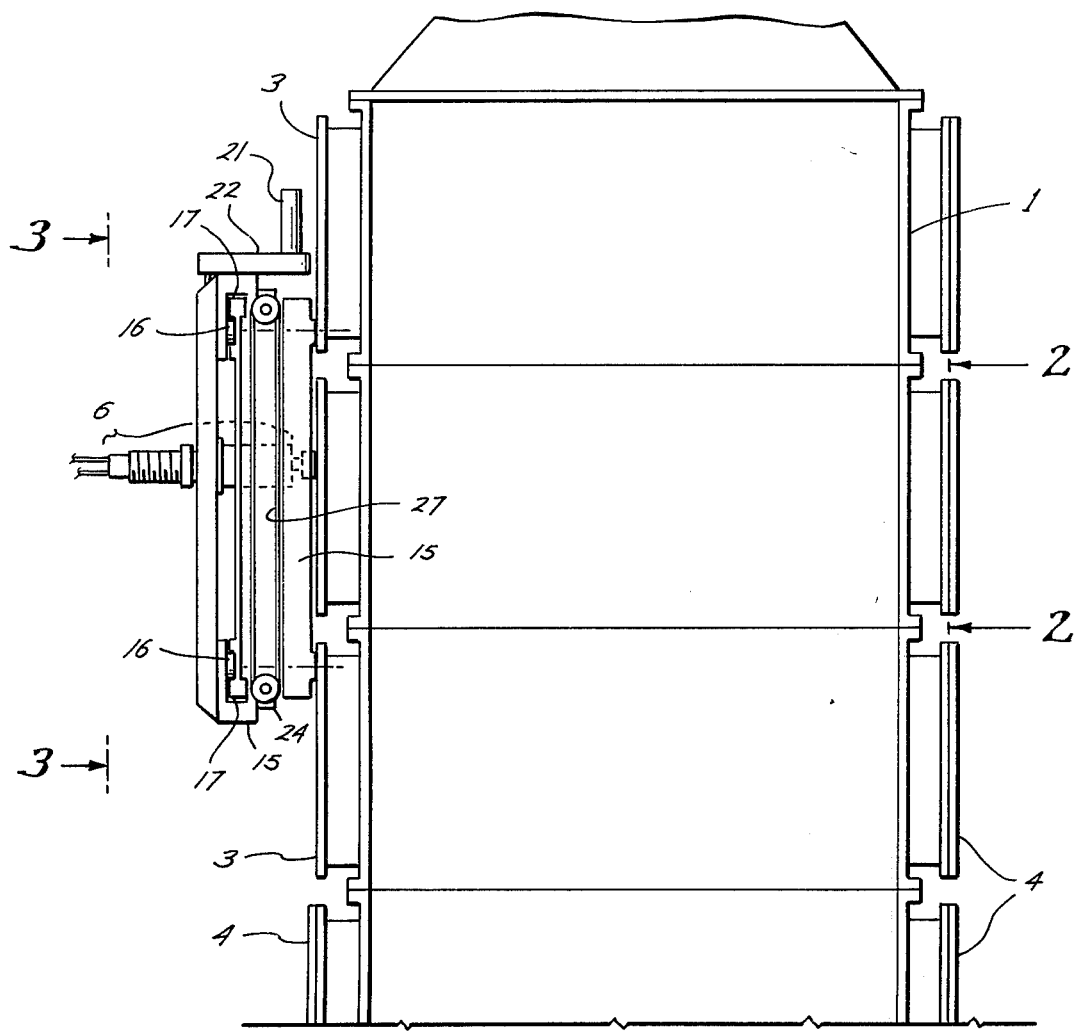
FIG. 1 is a side elevational view of a tube stack of a filter unit, showing the device attached to a door facing.
Figure 2:
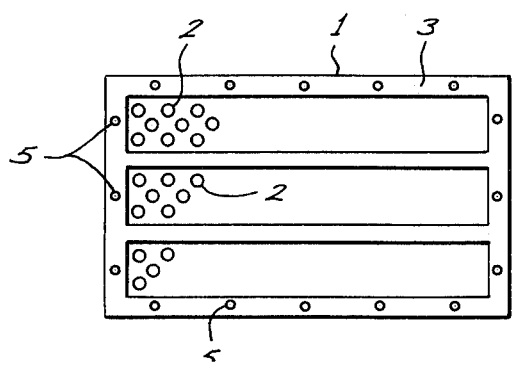
FIG. 2 is a side elevational view of a tube stack taken on the line 2—2 of FIG. 1.

In the drawings, the numeral 1 designates a tube stack having a series of tubes 2, 2 mounted therein and on which a series of door facings are provided, as 3, 3 on which doors are to be mounted, such as 4, 4, as by bolts mounted in the bolt holes 5, 5.

The door facing 3 must be milled to provide a close fit of the doors 4 thereon. The cutter 6 is mounted on the transverse carrier 7, which is mounted on the transverse tracks 9, and which may be moved longitudinally of the framework 15. An externally threaded shaft 10, mounted in the longitudinal carriages 11, 11, extends through a threaded port 12 in the transverse carriage 7, and the motor 13, through the gear box 14, rotates the shaft 10 to move the carriage 7 transversely of the framework 15.

The longitudinal carriages 11, 11 have the wheels 16, 16 which are mounted in the tracks 17, 17 of the longitudinal members 19, 19 of the framework. Externally threaded shafts, 18, 18, are mounted in the longitudinal side members of the framework and extend through the internally threaded ports 20, 20 in the longitudinal carriages 11, 11. A motor 21 operates the gear box 22 to rotate the flanged pulleys 23, 23, which in turn rotate the flanged pullies 24, 24, through the belts 25, 25, and thus rotate the shafts 18, 18, moving the longitudinal carriages 11, 11 longitudinally on the framework, the motor 21 being reversible to provide movement in either direction. Similarly, flanged pullies 26, 26 are connected by the belt 27, to maintain an even torque on the shafts 18, 18.

The cutter consists of the support member 7, which is slotted at 8, providing track receiving means to receive the track 9. The hydraulic motor 31 rotates the drive shaft 32 on which the cutter head 33 is mounted. An externally threaded housing 34, having a longitudinal keyway 35, receives the motor 31, and a bearing 36, mounted in the bearing chamber 38 of the housing 34, is provided to support the shaft 32, and is maintained in position by means of the annular collar 37, the bearing chamber 38 being internally threaded at its outer end to receive the collar 37, and an internal flange 39 forming the end wall of the bearing chamber 38. A knurled adjusting nut 40 is internally threaded and mounted on the external threads of the housing 34, and has the annular indentation 8 to receive the collar 29, which is bolted to the flanged collar 30. The key 41, anchored to the collar 30, slides longitudinally in the slot 38.

In operation, the framework 15 is bolted to the door facing, using the bolt holes 5, 5, exposing the portion of the door facing, or the like, to be milled, and the cutter head is adjusted to bear against the surface to be milled by rotating the nut 40, causing the housing 34 to move longitudinally in the collar 30, the key 41 holding the collar 30 against rotation. The motor 31 is then actuated to rotate the cutter head 33, and the motor 13 is actuated to rotate the shaft 10, moving the carriage 7 transversely on the framework. When the transverse cut is completed, the carriage 7 is moved to one extreme position adjacent one end of the transverse track 9, and the motor 21 is actuated to rotate the shafts 18, 18 moving the carriages 11, 11 longitudinally, while the cutter continues to rotate, so that the cutter may be moved over the entire facing of the work, effecting a milling on the longitudinal and transverse facings.

Where the framework 15 is mounted on a work piece having three doors, the cutter head is moved longitudinally and transversely as required to mill all of the facings. The size of the work piece to be milled being limited only by the inside dimensions of the framework.

What I claim is:

1. In a portable milling tool, a rectangular framework, tracks formed in the longitudinal member of the framework and carriages mounted to move longitudinally in said tracks, transverse tracks mounted on said carriages and a cutter carriage mounted on said transverse tracks, a cutter adjustably mounted on said cutter carriage and means for moving said cutter carriage transversely or longitudinally as said cutter is actuated, said cutter comprising a motor having a drive shaft extending from one end and a cutter head mounted on said drive shaft, a tubular housing receiving said motor having a bearing chamber and a bearing supporting said drive shaft, and said housing being externally threaded to receive an adjusting nut, and an internally threaded collar mounted on said housing and movable by said nut, said housing having a keyway formed longitudinally therein and a key anchored to said collar and mounted in said keyway maintaining said housing against rotation as the nut is rotated.

2. The device defined in claim 1 wherein independent motors are provided for independent operation of said carriages and said cutter.

* * * * *